July 23, 1935. R. NAFTALI ET AL Re. 19,653

SEWING MACHINE

Original Filed Aug. 16, 1932 4 Sheets-Sheet 1

Inventors
Valentine Naftali
Henry Naftali and
Rudolf Naftali
BY Geo. L. Wheelock
ATTORNEY SEWING MACHINE
Original Filed Aug. 16, 1932 4 Sheets-Sheet 2
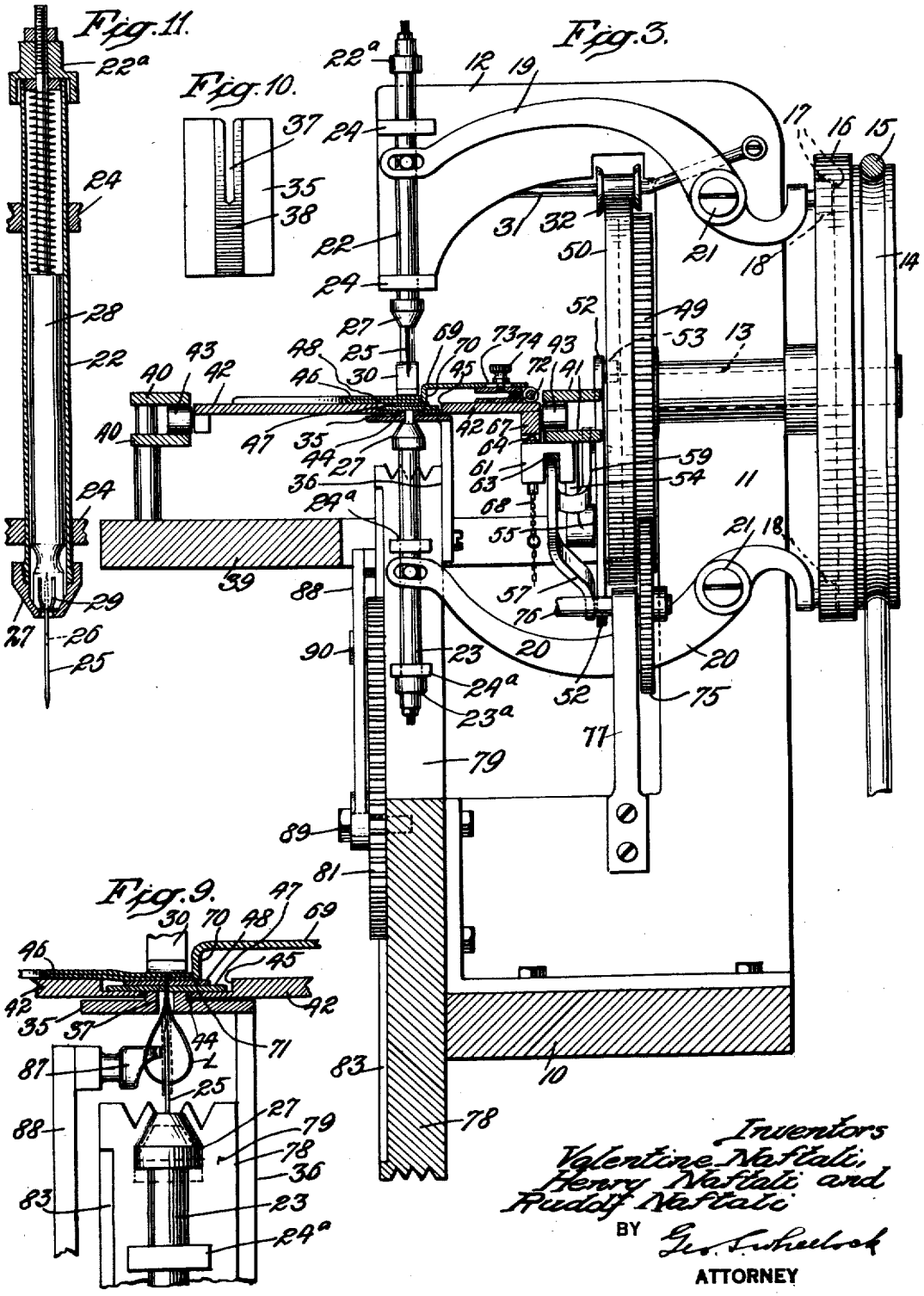
Inventors
Valentine Naftali,
Henry Naftali and
Rudolf Naftali
BY
ATTORNEY SEWING MACHINE
Original Filed Aug. 16, 1932 4 Sheets-Sheet 3
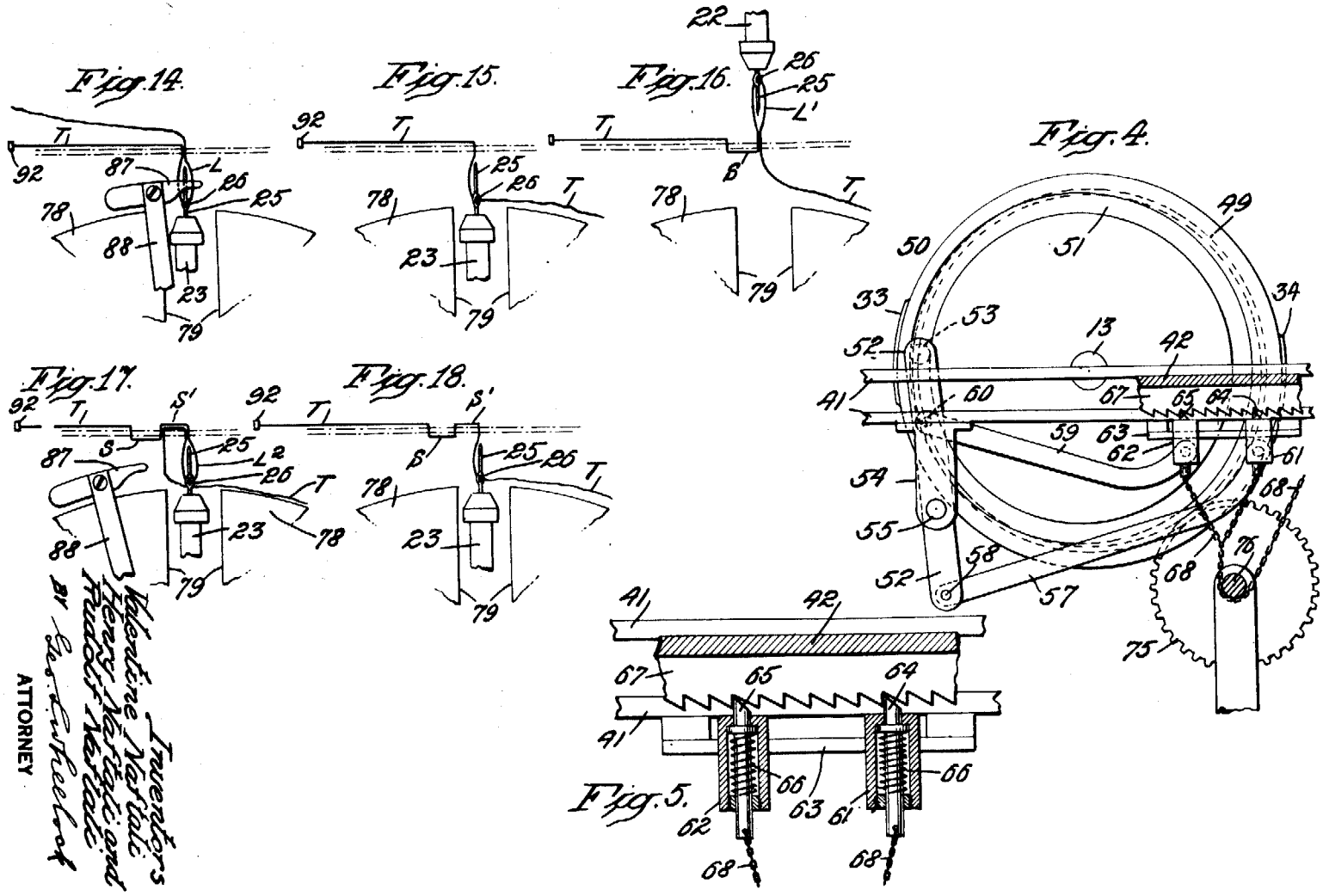
Inventors
Valentine Naftali
Henry Naftali and
Rudolf Naftali
By Geo. L. Wheelock
ATTORNEY SEWING MACHINE
Original Filed Aug. 16, 1932 4 Sheets-Sheet 4
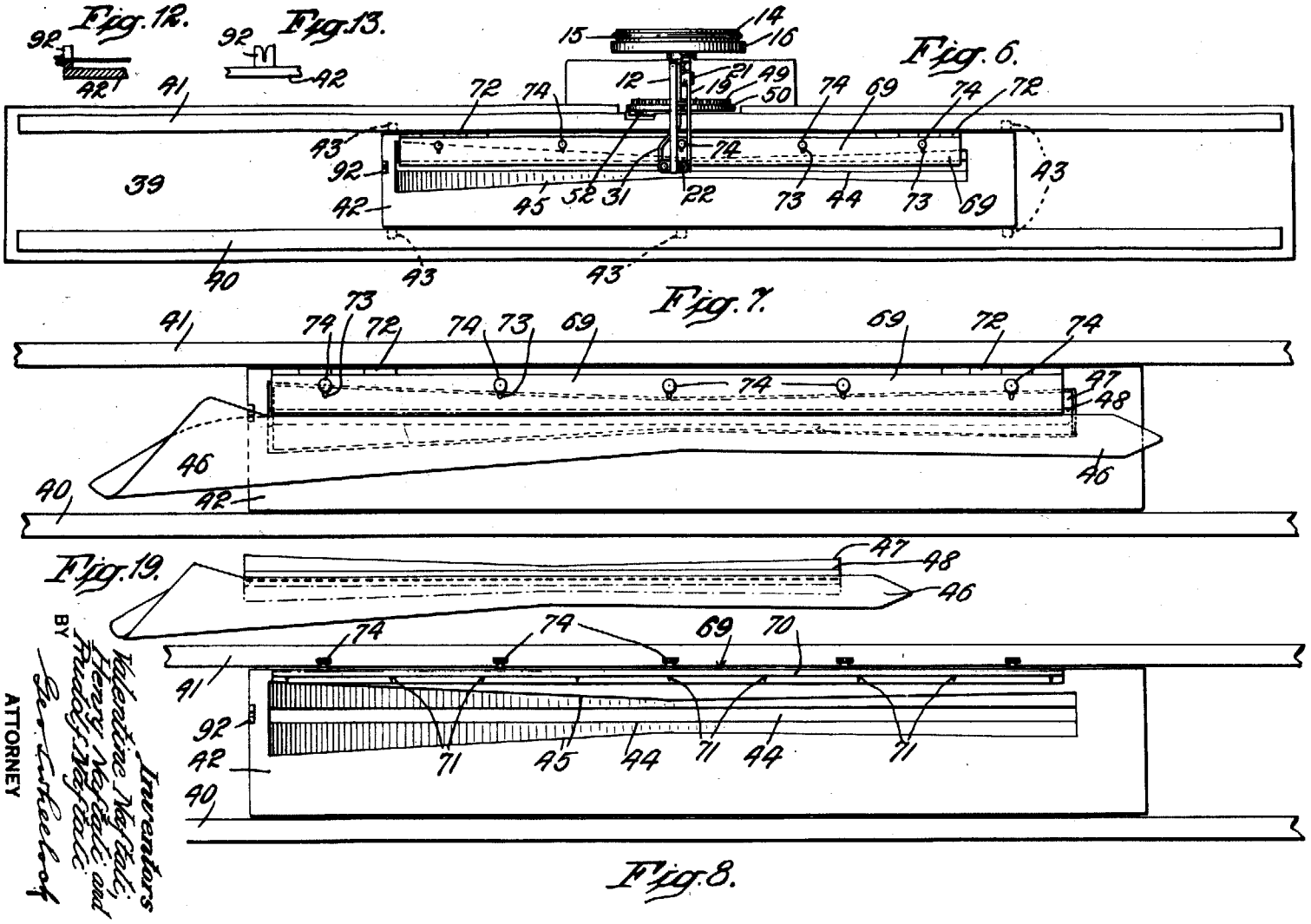
Inventors
Valentine Naftali,
Henry Naftali and
Rudolf Naftali
BY
Geo. Wheelock
ATTORNEY Reissued July 23, 1935 Re. 19,653

UNITED STATES PATENT OFFICE 19,653

SEWING MACHINE

Rudolf Naftali, Valentine Naftali, and Henry Naftali, New York, N. Y., assignors to Naftali Slip Stitching Process, Inc., New York, N. Y.

Original No. 1,931,447, dated October 17, 1933, Serial No. 629,000, August 16, 1932. Application for reissue April 17, 1935, Serial No. 16,848

34 Claims. (Cl. 112—171)

The present invention relates to sewing machines, preferably but not necessarily of the type wherein the needle is double pointed and has its eye located between the points, and wherein the opposite ends of the needle are grasped alternately by the jaws of opposed needle bars, such type of machine admirably lending itself for adaptation or modification into a machine for sewing together four-in-hand neckties and their linings, for example, whereby it is possible and practical to rapidly make complete neckties known in the trade as "slip stitch" neckties.

Other objects of the invention are to provide novel means for feeding the work, novel means for pulling the loose end of the thread through the work at the completion of each stitch, and novel means for more especially adapting the machine for supporting and holding a tie and its lining in position for sewing them together.

These and other objects of the invention being in view, the same consists of certain features of construction and combinations of parts to be hereinafter described and then claimed with reference to the accompanying drawings illustrating a preferred embodiment of the invention and wherein Fig. 1 is a side elevation, partly in section, of a sewing machine according to the present invention;

Fig. 3 is a sectional elevation of the machine transversely of Fig. 1;

Fig. 4 is a detail sectional elevation of the work feeding mechanism;

Fig. 5 is a detail horizontal section of parts of the work feeding mechanism;

Fig. 6 is a plan view of the machine to clearly show the traveling work supporting platform and concomitant parts;

Fig. 7 is an enlarged plan view showing portions of Fig. 6 and the holding of a necktie and its lining in position;

Fig. 8 is a similar view to Fig. 7 without the tie and its lining and showing the holding means raised from the work;

Fig. 9 is a detail transverse section, partly in elevation, through the work supporting platform and concomitant parts, the section being taken in the plane through which the needle operates;

Fig. 10 is a detail plan view of the throat plate through which the needle passes;

Fig. 11 is a detail section, partly in elevation, of the upper needle bar and concomitant parts;

Fig. 12 is a sectional detail of the preferred means for holding and positioning one end of the thread;

Fig. 13 is an elevation taken at right angles to Fig. 12;

Figs. 14, 15, 16, 17 and 18 are detail views to graphically illustrate the manner in which the machine operates in sewing the work; and Fig. 19 is a plan of the tie as sewn to the lining similarly with the same parts as shown in Fig. 7.

Figures 1, 2:
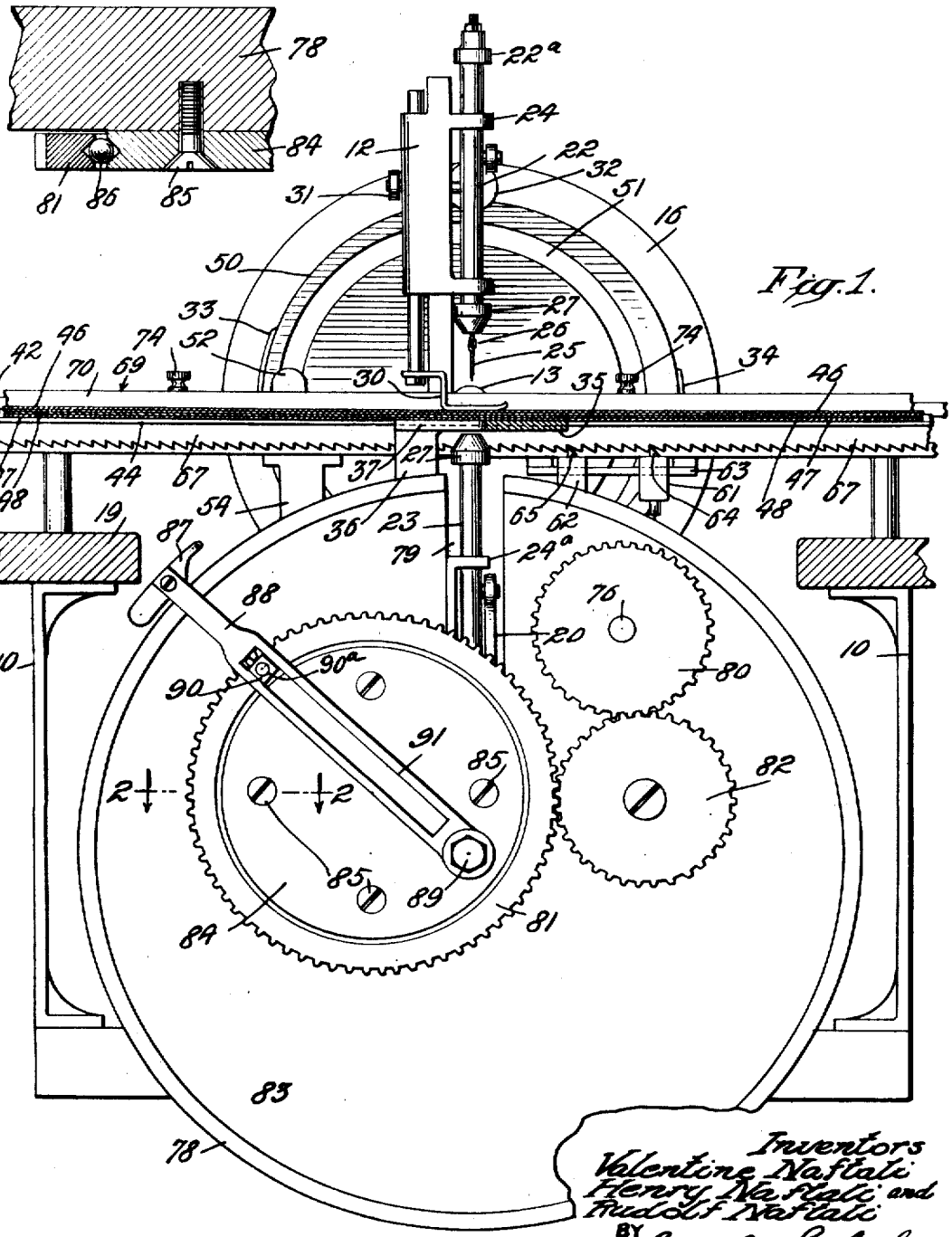
Fig. 2 is a detail transverse section on line 2—2, Fig. 1.

Referring more particularly to Figs. 1 and 3, they show a sewing machine comprising the parts 10 on a stationary frame, the upright 11 extending therefrom and the sewing machine arm 12. As the machine illustrated is of the type referred to, the same is provided with a power shaft 13 mounted in a bearing of the upright 11, a belt pulley 14 on the shaft and a belt 15 on the pulley, which belt is driven by an electric motor or otherwise, provided with well known means of control. The pulley 14 is provided at its inner face with an enlarged disk portion 16 having at its inner face a profiled cam 17 which extends annularly around the disk.

Rollers 18, 18 are positioned at diametrically opposite points of the disk 16 to bear on the surface of the cam 17, these rollers being carried at the rearward ends of oscillatory arms 19, 20. Each of the arms 19, 20 is mounted upon an intermediate pivot stud 21 extending from the upright 11. An upper needle bar 22 and a lower needle bar 23 arranged in alignment are connected by pin-and-slot connections, respectively, with the arms 19 and 20 whereby to convert the oscillatory motion of the arms into a rectilinear motion of the needle bars. Each needle bar is made as more clearly shown in Fig. 11. The needle bars 22 and 23 are guided respectively in a pair of guides 24 and a pair of guides 24*a*. The guides 24 are formed by lugs on the sewing machine arm 12 and the support for the guides or lugs 24*a* will be specifically described hereinafter. The parts of the needle bar are well known as well as the type of needle carried by such needle bars and such parts will now be described.

A double pointed needle 25 is provided, that is one having a point at each end, between which points is located the eye 26, at about the mid-length of the needle. Tapered caps 27 are screwed onto the corresponding ends of the needle bars and the same serve to confine spring pressed shanks 28, said springs being arranged to abut the upper and lower ends of the hollow needle bars, respectively, to exert spring action upon the shanks 28. Positioned on the outer ends of the shanks 28 are caps or heads 22*a*, and 23*a*, and the opposite ends of the shanks 28 are provided with spring jaws 29.

It will be understood by those skilled with this type of machine that the needle 25 is alternately grasped by the jaws 29 of each needle bar. Briefly the action is such that as the oscillating arm 19 carries the needle bar 22 inwardly toward the work, the nut or head 22a will abut the upper lug or stop 24 with the result that the needle is released from the upper needle bar, the needle being taken over by the lower needle bar in the same way that the upper needle bar does the some. The upper needle bar in taking the needle from the lower needle bar is caused to rise and to remove the head 22a from engagement with the stop 24, so that at the moment this occurs the jaws 29 are caused to clutch the needle by reason of the spring in the needle bar 22 being free to act to force the jaws into the tapered cap 27. In other words, whenever the head 22a is out of engagement with the stop 24, the spring in the needle bar 22 is free to press the gripping jaws 29 into the tapering cap 27, thereby causing such jaws to grip the needle. The spring of the lower needle bar acts alternately therewith in the same manner.

A presser foot 30 is provided which is operated by a lever 31 on the machine arm 12 which in turn is operated through the medium of a roller 32 located on the lever 31, which roller rides over cam projections 33, 34 carried by a part of the machine to be hereinafter described. A stationary plate 35 as shown in detail in Fig. 10 is mounted on the upper end of a support 36 mounted on a part hereinafter described. This plate 35 is disposed horizontally in a plane parallel with the plane of feed of the work and is provided with a slot 37 forming a throat through which the needle 25 may be caused to pass during the sewing operation. Plate 35 is furthermore provided with a guide rib 38 in which the throat 37 is directly located. Such rib 38 extends in the direction of the feed.

A stationary table top 39 is provided, the same having mounted thereupon a pair of guide-rails 40 and a separate pair of guide-rails 41, there being a pair of rails at each side of the line along which the stitching is performed by the machine. These guide-rails 40, 41 are parallel and are adapted to guide a traveling material supporting platform 42, through the medium of anti-friction rollers 43 at each side edge of the traveling platform. Said platform 42 is provided as more clearly shown in Figs. 3, 6 and 9 with a longitudinal slot 44 which receives the longitudinal rib 38 of the throat plate 35. The platform is centered against lateral movement by being confined between guide rails 40, 41 and is permitted to travel longitudinally when operated by the work feeding mechanism. The rib 38 provides a stationary support for the work immediately around the needle, the upper surface of which is preferably on a level with the top surface of the platform 42, so that the work will not be gathered or drawn when the needle passes through the same.

There is a profiled recess 45 in the platform 42, such recess being bisected by the longitudinal slot 44. This recess is preferably profiled to accord with the shape of the piece of lining which is to be used in sewing it onto neckties 46 of the four-in-hand type, as shown in Fig. 7. The lining 47 is placed in the recess 45, and having been properly positioned longitudinally with the direction of feed, the longitudinal edge portions of the folded tie 46 are placed over onto the lining, there being preferably an intervening tape 48 between the tie and the lining, as shown in Fig. 7. Further explanations in these connections will be made later on.

Referring to Figs. 1, 3 and 4 there is mounted rigidly upon the power shaft 13 a large gear-wheel 49 for the purpose hereinafter described. This gear-wheel is provided with an enlarged disk portion 50 on which the cams 33, 34 are located, which cams are for the purpose of operating the presser foot 30. The disk portion 50 is provided in its forward face with a cam or eccentric groove 51 which controls the operation of the feeding mechanism. The feeding mechanism comprises an oscillatory lever 52 having a pin 53 positioned in the cam groove 51, such lever being mounted upon a bracket 54 by means of a pivot 55 so located as to provide two arms to said lever, one of which carries the said cam pin 53. The bracket 54 is fixed to the lower one of the stationary guide rails 41. The lower arm of the lever 52 is operatively connected with a link 57 by means of a pivot 58 at one end of said link. The upper arm of lever 52 is connected with a link 59 by means of a pivot 60.

By means of the lever 52 the links or arms 57, 59 are caused to reciprocate alternately in opposite directions for the purpose of operating the pawls of the pawl and ratchet mechanism more clearly shown in Figs. 1, 4 and 5. This mechanism comprises pawl carriers 61, 62 to which the adjacent ends of the arms or links 57, 59 are pivoted. To this end the pawl carriers 61, 62 are made of U-shape as in Fig. 3 and the ends of the links 57, 59 project into the recesses formed by the shape of said pawl carriers. These pawl carriers 61, 62 straddle a short guide bar 63 which is fixed to the lower bar of the guide rails 41. The pawl carriers are so mounted upon the guide bar 63 as to be freely movable thereupon when operated by the links 57, 59. One of the carriers 61, 62 is provided with a pawl 64 and the other carrier with a pawl 65. These pawls are in the shape of short stems, corresponding ends of which are beveled in the same direction, and the beveled or toothed ends thereof are pushed outwardly through the intervention of helical springs 66 coiled within the carriers 61, 62. The action of the springs 66 is to cause the beveled or toothed ends of the pawls to engage or take between the ratchet teeth of a rackbar 67. This rack-bar 67 is fixed to the underside of the intermittently movable traveling platform 42 which supports the work.

It will be seen that the action of the cam 51 on the oscillating lever 52 is such as to alternately reciprocate the links 57, 59 in opposite directions and that the traveling platform 42 is moved to advance the work at each operative engagement of the pawls 64, 65. The arrangement and operation of the involved parts in this connection are such that as the pawl 64 moves forwardly in operative engagement with the ratchet teeth of rack 67, the pawl 65 is moved in opposite direction so as to idle over the ratchet teeth. When the pawl 65 is moving in reverse direction it is in operative engagement with the teeth of the rack so as to feed the platform, while the other pawl 64 idles in reverse direction. Thus the traveling platform is caused to advance at the end of each stitch formed in the work. Suitable release means for the pawls may be provided whereby to disengage their toothed ends from the rack bar 67, whereby to permit the traveling platform to be moved back to normal position after the completion of the sewing of each piece of work and to begin upon another piece of work. Such means may comprise a pull chain 68 or the like which is operated in any suitable way.

Now referring to Figs. 3, 6, 7, 8 and 9, the means for engaging and holding the work will be described. An elongated gage bar 69 is provided which is arranged and mounted so as to extend longitudinally with the direction of feed. This gage bar 69 is provided with a material engaging flange 70 (Fig. 9) which is provided with prongs or sharp teeth 71. Hinges 72 are connected with the innermost edge of gage bar 69, such hinges being fixed to the inner edge portion of the traveling platform 42 as shown in Fig. 3. By swinging the gage bar down upon its hinges, its prongs 71 will be caused to penetrate the neck-tie lining 47 and the tape 48 thereover, thereby positively retaining them in position in the recess 45. When the gage bar is so positioned, its flange 70 constitutes the gage proper for the edges of the tie which are to be sewed together. Transverse slots 73 are formed in the gage bar 69 and through these pass set-screws 74 which are adapted to screw into the adjacent leaves of the hinges 72, thereby to render the gage bar laterally adjustable so as to determine the distance of the meeting edges of the tie from the line of stitching which is to be formed.

Referring to Figs. 1, 3 and 9, the mechanism for engaging the loops as formed from the thread in stitching and the drawing or pulling out of the free end portion of the thread, will now be described. A gear wheel 75 meshing with the larger gear 49 heretofore referred to rotates at greater speed with a counter-shaft 76 mounted in suitable bearings on a bracket 77 and of a circular stationary support 78, these parts being mounted on the frame of the machine at points below the horizontal plane of the platform 42. This circular stationary member or support 78 is made of large diameter for reasons as will appear herefrom.

A slot 79 extending radially is formed in the circular stationary member 78, such slot extending vertically and receiving within it the lower needle bar 23. The guide lugs 24a of said needle bar and which were before mentioned are fixed to one of the vertical walls of the slot 79 so as to guide the needle bar 23 vertically. A train of gears 80, 81 and 82 is mounted upon the front face of the circular stationary member 78, which is formed with a recess 83 to receive the same. The gear 80 is mounted on the shaft 76 and the gear 82 is an intermediate gear between gear 80 and gear 81 which is in the form of a toothed annulus or ring mounted so that it may be rotated upon a circular track disk 84 which is rigidly fixed by means of screws 85 to the front face of the circular stationary member 78. A detail of this construction is shown in Fig. 2, showing also ball bearings, 86, for the rotary element. It will be seen that the axis of rotation of the gear annulus or ring 81 is eccentric to the axis of the large stationary member 78.

The thread puller 87 having a forward pointed end is mounted so that it may be carried in a circular path around the periphery of the circular stationary member 78. The thread puller is fixed on the outer end of a carrier arm 88 which is pivoted on a pivot 89 fixed at the axis of the stationary circular member 78. For operating the arm 88 and the thread puller 87, a button or block 90 is mounted so that it is slidable in a longitudinal slot 91 of said arm, said block being swiveled upon a pivot stud 90a extending from the front side of the toothed annulus or ring 81. It will be seen that the turning of the toothed annulus 81 will thereby be enabled to move the thread puller 87 in its circular path by acting to rotate the arm 88 around its pivot 89.

By the inclusion of a slidable connection between the annulus or gear 81 and the arm 88, the thread puller 87 is caused to move more slowly when it is about to pull or is first pulling the thread out from the work than when it is moving away from the work in entirely pulling out the thread. Therefore the fact is that the thread puller does not act with such quickness in starting the pull of the thread from the work with a tendency to fray out the thread after a number of pulls or with a tendency to jerk and break the thread, but after the pull is started, the thread puller pulls faster when the danger is over. Specifically the action of the illustrated thread puller is to pull with gradually increasing speed from about the time that it first engages with the thread, and then the puller is returned toward its thread pulling position at a gradually decreasing speed.

Referring to Figs. 6, 12 and 13, a notched thread securer 92 is shown which is mounted fixedly on the left hand or advancing end of the traveling work supporting platform 42. Preferably the thread used in sewing is cut into suitable lengths and one end of each length is knotted and the knotted end engaged in the notch of the thread securer 92 as shown in Fig. 12.

The operation of the machine will now be described briefly, more particularly in connection with the sewing of linings to neckties. The product of the machine is shown in Fig. 19 where it will be seen that the edges of the folded over tie are connected by a line of stitching which extends through the lining 47 and the intervening tape 48 which is preferably employed. The machine produces a sewn tie which as shown is wrong-side out, but which has to be turned or reversed so as to bring the lining and tape into the tie and form a finished tie constructed the same as a hand made tie. When the thread is secured at one end by the thread securer 92, it is threaded through the eye of the needle 25, said needle being held by the upper needle bar. The lining, tape and tie are then placed in their proper positions upon the traveling platform 42, with the edges of the folded over tie in contact with the flange of the gage bar 69, the platform 42 being over to the right to its starting position. The machine may now be started and the traveling platform 42 carries the work to the left during the stitching, the operator taking care that the tie is properly held up to the gage bar. The feed of the traveling platform 42 will be intermittent during the stitching, the said feed being controlled by the cam 51 which through the mechanism previously described alternately operates the feed pawls 64, 65 and these engage the teeth of the rack-bar 67 of the traveling platform.

The needle 25 is passed through the work alternately in opposite directions, thereby carrying the thread with it, the needle bars acting in well known manner to successively engage and release the needle. The successive steps in the process of sewing are illustrated in Figs. 14 to 18 inclusive, which may be considered in connection with Fig. 9, these views also illustrating the method of forming regular or similarly sized loops from the free end portion of the thread at points below the work as the work advances. In Fig. 14 the needle is shown as having passed through the work through the action of the upper needle bar and as having been grasped by the jaws of the lower needle bar 23. The thread T being held at one end at a point away from the needle, it is drawn through the fabric in the form of a loop L to receive the pointed end of the thread puller 87 as it is moved around by the mechanism previously described. In the extreme outward position the loop will present the appearance shown in broken lines in Fig. 9, but just as soon as the needle bar 23 moves upwardly for a short distance, the loop will be loosened into the full line position, shown in said figure, at which time the thread puller 87 enters the loop L and as the thread puller is moving continuously it will promptly act to pull the free portion of the thread out from the fabric as shown in Fig. 15. This loose portion is carried by the thread puller upon the periphery of the circular stationary member 78 as the puller moves rearwardly in its own circle of movement. The upwardly reciprocating needle bar 23 causes the needle to pass through the work for the length of the stitch S, the needle then being grasped by the jaws of the upper needle bar 22, carrying the thread with it and forming a loop $L^1$, as shown in Fig. 16. The work is now advanced for the length of a second stitch $S^1$ as the needle is moved down through the work, such needle being grasped by the jaws of the lower needle bar 23 upon release from the upper needle bar, so that the thread is laid into the position substantially as shown in Fig. 17. From Fig. 17 it will be seen that a loop $L^2$ corresponding substantially in size with the previous loop $L^1$ formed below the traveling platform has been formed along the work and that the free portion of the thread extends through it for the length of such stitch $S^1$. At about this time the thread puller 87 comes into action and engages the loop $L^2$ so as to pull out the free portion of the thread from the two points of the work through which it passes, thereby producing the result shown in Fig. 18 where the remaining portion of the thread is seen to be entirely free from the work and may hang as a loose end. As the stitching advances the formation of successive similarly sized loops and the sewing of the work are completed and the machine is stopped and the work, consisting in this instance of the stitched tie and lining, is removed from the machine. Of course the presser foot 30 engages with the work each time the needle is passed through it, but is released therefrom for a moment, at the time when the work is being fed forward intermittently.

Obviously the invention is susceptible to a more or less wide range of modification which can be resorted to by those skilled in the art without departing from the spirit of the invention as defined in the scope of the appended claims.

What we claim as new, is—

1. In a sewing machine, the combination of alternately operating needle bars, a needle, means to alternately connect the needle with each needle bar, a traveling work supporting platform having a longitudinal slot, a throat plate for the passage of the needle, and having a portion entering the slot, means for securing one end of a thread for the needle, means for advancing the platform once for each stitch, and means for pulling the free portion of the thread out from the work while the needle is held by one of the needle bars.

2. In a sewing machine, the combination of alternately operating needle bars, a needle, means to alternately connect the needle with each needle bar, a traveling work supporting platform having a longitudinal slot, a throat plate for the passage of the needle, and having a rib entering the slot, the throat being in the rib, means for securing one end of a thread for the needle, means for advancing the platform once for each stitch, and means for pulling the free portion of the thread out from the work while the needle is held by one of the needle bars.

3. In a sewing machine, the combination of alternately operating needle bars, a needle, means to alternately connect the needle with each needle bar, parallel guide rails, a traveling work supporting platform thereon having a longitudinal slot, a throat plate for the passage of the needle, and having a portion entering the slot, means for securing one end of a thread for the needle, means for advancing the platform once for each stitch, and means for pulling the free portion of the thread out from the work while the needle is held by one of the needle bars.

4. In a sewing machine, the combination of a needle operating mechanism, a traveling necktie supporting platform, having a longitudinal slot and a profiled recess bisected longitudinally by the slot, for receiving a formed lining for the tie, the needle passing through such slot, means for imparting a step by step advancing movement to the platform in a direction perpendicularly of the direction of movement of the needle and means for pulling a loose thread entirely out of the stitched tie and lining as the platform carrying them advances.

5. In a sewing machine, the combination of a needle operating mechanism a traveling neck-tie supporting platform, having a longitudinal slot and a profiled recess bisected longitudinally by the slot, for receiving a formed lining for the tie, the needle passing through such slot, means for imparting a step by step advancing movement to the platform in a direction perpendicularly of the direction of movement of the needle, a gage hingedly mounted on the platform to one side of and parallel with the slot for determining the line of stitching along a line parallel with the gage, and means for pulling a loose thread entirely out of the stitched tie and lining as the platform carrying them advances.

6. In a sewing machine, the combination of a needle operating mechanism, a traveling neck-tie supporting platform, having a longitudinal slot and a profiled recess bisected longitudinally by the slot, for receiving a formed lining for the tie, the needle passing through such slot, a plate having a throat for the passage of the needle and a projection entering such slot, and means for pulling a loose thread out of the stitched tie and lining as the platform advances.

7. In a sewing machine, the combination of a needle operating mechanism, a traveling work supporting platform having a longitudinal slot through which the needle moves, and means timed with the needle operating mechanism for intermittently advancing the platform, such means including a pair of carriers movable to and from each other, a pair of outwardly urged pawls, one on each carrier, and a bar for moving the platform and having elements engaged by the pawls, each of which pawls operates alternately with the other pawl to advance the platform.

8. In a sewing machine, the combination of a needle operating mechanism, a traveling work supporting platform, means timed with the needle operating mechanism for intermittently advancing the platform, such means including a pair of carriers movable to and from each other, a pair of longitudinally movable outwardly urged stems guided in each carrier, and terminated at their outer ends with pawl-teeth beveled in the same direction, and a bar for moving the platform and having elements engaged by the pawls, each of which pawls operates alternately with the other pawl to advance the platform.

9. In a sewing machine, the combination of a needle operating mechanism, a traveling work supporting platform, means timed with the needle operating mechanism for intermittently advancing the platform, such means including a pair of carriers movable to and from each other, an oscillatory lever having an intermediate pivot, an arm pivoted to each of the carriers, the arms movable from the lever from opposite sides of its pivot, an outwardly urged pawl on each carrier, and a bar for moving the platform and having teeth engaged by the pawls, each of which pawls operates alternately with the other pawl to advance the platform.

10. In a sewing machine, the combination of a needle operating mechanism, a longitudinally traveling work supporting platform, means timed with the needle operating mechanism for intermittently advancing the platform, a gage movably mounted on the platform for the abutment of one edge of one piece of the work with and along the lateral edge of the gage, and determining the line of stitching, and means associated with the gage and extending substantially from end to end thereof for positively engaging and holding another piece of the work in position for stitching to such gage-abutting piece of work along such line.

11. In a sewing machine, the combination of a needle operating mechanism, means independent of the needle for positively supporting one end of a loose thread having its free portion threaded and freely passing through the needle, such operating mechanism and needle adapted to form loops away from one surface of the work, means located opposite to such surface for engaging such loops in succession as the work advances in stitching and for fully drawing out the free portion of the thread from the work, such loop engaging means, including a pivoted arm having at its free end a pointed thread puller, and moved by the arm to and from each loop as it is formed, the point of the puller entering the loop in reverse direction to the direction of feed of the work, and a member acting on the arm to cause the thread puller to move through a complete circle, and a member concentric with the puller and in the plane of the path of movement of the puller, for supporting the entirely free portion of the thread when it is drawn out, the machine being free from such loop engaging means and such a supporting member opposite to the other surface of the work.

12. In a sewing machine, the combination of a needle operating mechanism, means for positively supporting one end of a loose thread having its free portion threaded through the needle, such operating mechanism and needle adapted to form loops away from one surface of the work, and means for engaging such loops in succession as the work advances in stitching and for drawing out the free portion of the thread, such loop engaging means, including a pivoted arm having at its free end a thread puller, and moved by the arm to and from each loop as it is formed, and means for operating and timing the thread puller and arm, including a train of gears operable with the needle operating mechanism, one of the gears being in the form of an annulus and the pivot of the arm being mounted at a stationary point within the annular gear, and a member carried by the annular gear and in traveling engagement with the arm, whereby to cause the thread puller to move through a complete circle.

13. In a sewing machine, the combination of alternately operating needle bars, a needle, means to alternately connect the needle with each needle bar, a traveling neck-tie platform having a longitudinal slot through which the needle passes, and also having a profiled longitudinal recess bisected by the slot for receiving a formed lining for the tie, means for intermittently advancing the platform for each stitch, a movable gage on the platform against which a folded portion of the tie is engaged for determining the line of stitching through the tie and lining, the same provided with means for holding the lining in position in the recess, means at one end of the platform for supporting a loose thread having its free portion threaded through the needle, such needle and needle bars adapted to form loops in the thread, a puller for engaging successive loops away from the lining and pulling out the free portion of the thread and drawing the thread away from the tie, and means for causing the puller to thus act.

14. In a sewing machine, the combination of needle operating mechanism, a traveling necktie supporting platform, a presser foot, means to move the presser foot alternately into and out of engagement with the tie, and means for imparting a step by step advancing movement to the platform, one step for each stitch as the presser foot is released from the necktie, the platform having a longitudinal slot through which the needle passes in its movements, and also having means for positioning a formed tie-lining so as to cover and extend along the slot, the platform supporting the tie and lining across the slot.

15. In a sewing machine, the combination of a needle operating mechanism including alternately operating needle bars, a needle, and means to alternately connect the needle with each needle bar, means located at a point laterally away from the needle for positively supporting one end of a loose thread having its free end portion threaded and freely passing through the needle, such operating mechanism and needle adapted to form successive stitches in a direction away from the positive means and to form loops of substantially the same size away from one surface of the work and directed toward one of the needle bars, and means for engaging such loops in succession, and while the needle is held by such needle bar, as the work advances in stitching and for entirely drawing out from the work the free end portion of the thread, such loop engaging means including an annularly movable thread puller and means operable on the puller to move it through such path.

16. In a sewing machine, the combination of a needle operating mechanism, means located at a point laterally away from the needle for positively supporting one end of a loose thread having its free end portion threaded through the needle, a longitudinally traveling work supporting platform, such operating mechanism and needle adapted to form successive stitches as the platform moves along with the work in a direction away from the positive means and to form similarly sized loops away from one surface of the work, and means for engaging such loops in succession as the work advances in stitching and for entirely drawing out the free end portion of the thread, such loop engaging means including an annularly movable thread puller and means operable on the puller to move it through such annular path.

17. In a sewing machine, the combination of a needle operating mechanism, a traveling necktie supporting platform, having a longitudinal slot and a profiled recess in one surface bisected longitudinally by the slot, for receiving a formed lining for the tie, the needle passing through the slot, a plate fixed adjacent the opposite surface of the platform and having a throat for the passage of the needle, and means for pulling a loose end portion of a thread entirely out of the stitched tie and lining as the platform advances.

18. In a sewing machine, the combination of a needle operating mechanism, a traveling necktie supporting platform, having a longitudinal slot and a profiled recess bisected longitudinally by the slot, for receiving a formed lining for the tie, the needle passing through such slot, means at each edge of the platform for guiding the same longitudinally across the path of the needle, a plate having a throat for the passage of the needle and a projection entering such slot, and means between the edge guiding means of the platform for pulling a loose end portion of a thread entirely out of the stitched tie and lining as the platform advances.

19. In a sewing machine, the combination of alternately operating needle bars, a needle, means to alternately connect the needle with each needle bar, a traveling necktie supporting platform having a longitudinal slot through which the needle passes, and also having a profiled longitudinal recess intersected by the slot for receiving and positioning a formed lining for the tie, means for intermittently advancing the platform longitudinally for each stitch when a folded longitudinal portion of the tie is in proper position for stitching the tie and lining together along a line parallel with the slot and the direction of movement of the platform, means on the platform for securing a loose thread having its free portion threaded and guided through the needle, such needle and needle bars adapted to form similarly sized loops in the thread, a puller for engaging successive loops and pulling them away from the lining and tie and pulling out the entirely free portion of the thread, and means for causing the puller to thus act.

20. In a sewing machine, the combination of needle operating mechanism, a traveling work supporting platform, means for guiding the platform in a direction across the line of movement of the needle, means for moving the platform with the work thereon forwardly step by step across such line, the platform having a through-slot extending in the same direction as that of its forward movement and through which the needle passes in its movements, means moving with the platform for securing one end of a thread at a point away from the needle through which needle the thread is freely guided, whereby there is left a loose end portion of the thread free of the work, means for causing the needle in stitching to form successive similarly sized loops from such free end portion of the thread, in a direction away from the surface of the platform other than the surface opposite that on which the thread supporting means are located, as the platform advances, and means opposite such other surface of the platform for engaging such loops in succession and pulling the free end portion of the thread entirely out from the work and through the slot as the platform advances.

21. In a sewing machine, the combination of needle operating mechanism, a traveling work supporting platform, means for guiding the platform in a direction across the line of movement of the needle, means for moving the platform with the work thereon forwardly step by step across such line, the platform having a through-slot extending in the same direction as that of its forward movement and through which the needle passes in its movements, a thread securer upon one surface of the platform for supporting one end of a thread which is guided freely through the needle whereby there is left a loose end portion of the thread free of the work, means for causing the needle in stitching to form successive similarly sized loops from such free end portion of the thread in a direction away from the other surface of the platform as the platform advances, and means opposite such other surface of the platform for engaging such loops in succession and pulling the free end portion of the thread entirely out from the work and through the slot as the platform advances.

22. In a sewing machine, the combination of needle operating mechanism, a traveling work supporting platform, means for guiding the platform in a direction across the line of movement of the needle, means for moving the platform with the work on the upper surface thereof forwardly step by step across such line, the platform having a through-slot extending in the same direction as that of its forward movement and through which the needle passes in its movements, means moving with the platform for supporting one end of a thread above such surface at a point away from the needle through which needle the thread is freely guided, whereby the needle is adapted to pass doubled up portions of the thread successively through the work and the slot as it stitches, and there is left a loose end portion of the thread free of the work, means for causing the needle in stitching to form successive similarly sized loops from the doubled portions of such free end portion of the thread in a direction inwardly of the inner surface of the platform as the platform advances, and means opposite the inner surface for engaging such loops in succession and pulling the free end portion of the thread entirely out from the work and through the slot as the platform advances.

23. In a sewing machine, the combination of needle operating mechanism, a traveling work supporting platform, means for guiding the platform in a direction across the line of movement of the needle, means for moving the platform with the work on the upper surface thereof forwardly step by step across such line, the platform having a through-slot extending in the same direction as that of its forward movement and through which the needle passes in its movements, a thread securer upon such upper surface at the front end of the platform for supporting one end of a thread which is guided freely through the needle, whereby there is left a loose end portion of the thread free of the work, means for causing the needle to form after alternate stitches successive similarly sized loops from such free end portion of the thread inwardly of the inner surface of the platform as the platform advances and as the stitching proceeds in a direction away from the thread securer, and means for engaging such loops in succession and pulling the free end portion of the thread entirely out from the work and through the slot as the platform advances.

24. In a sewing machine, the combination of a needle operating mechanism, means for positively supporting one end of a loose thread having its free end portion guided freely through the needle, such operating mechanism and needle adapted to form stitches in the work and similarly sized loops in a direction away from one surface of the work, a thread-puller for engaging such loops in succession as the stitching proceeds and for drawing out the end portion and freeing it entirely from the work, and means moving the thread-puller at less speed as it engages each loop of thread than the speed at which it pulls out and frees the end portion of the thread from the work.

25. In a sewing machine, the combination of a needle operating mechanism, means for positively supporting one end of a loose thread having its free end portion guided freely through the needle, such operating mechanism and needle adapted to form stitches in the work and similarly sized loops in a direction away from one surface of the work, a thread-puller for engaging such loops in succession as the stitching proceeds and for drawing out the end portion and freeing it entirely from the work, means for guiding the thread-puller in an annular path, and means moving the thread-puller through its path at an increasing speed as it pulls out each loop and disengages the end portion of the thread from the work and at a decreasing speed when it is approaching and about to engage each loop.

26. In a sewing machine, the combination of a needle operating mechanism including alternately operating needle bars, a needle, and means to alternately connect the needle with each needle bar, means for positively supporting one end of a loose thread having its free end portion guided freely through the needle, such operating mechanism and needle adapted to form stitches in the work and similarly sized loops in a direction away from one surface of the work, a thread-puller for engaging such loops in succession as the stitching proceeds and for drawing out the end portion and freeing it entirely from the work, and means moving the thread-puller at less speed as it engages each loop of thread than the speed at which it pulls out and frees the end portion of the thread from the work.

27. In a sewing machine, the combination of a needle operating mechanism including alternately operating needle bars, a needle, and means to alternately connect the needle with each needle bar, means for positively supporting one end of a loose thread having its free end portion guided freely through the needle, such operating mechanism and needle adapted to form stitches in the work and similarly sized loops in a direction away from one surface of the work, a thread-puller for engaging such loops in succession as the stitching proceeds and for drawing out the end portion and freeing it entirely from the work, means for guiding the thread-puller in an annular path, and means moving the thread-puller through its path at an increasing speed as it pulls out each loop and disengages the end portion of the thread from the work and at a decreasing speed when it is approaching and about to engage each loop.

28. In necktie making apparatus, a platform having means for positioning a necktie lining thereon in desired predetermined position, a gauge on said platform having means for holding the lining down thereon, said gauge having a longitudinal surface extending substantially the length of the tie to serve as a guide for aligning an edge of the necktie material superimposed on said lining and to be stitched thereto.

29. In apparatus for stitching a lining to a necktie, a support, means on said support for positioning a necktie lining thereon, a gauge pivotally mounted on said support for the alignment of one edge of the necktie with and along the lateral edge of the gauge and determining the line of stitching, and means associated with the gauge and extending substantially from end to end thereof for holding the lining in position for stitching said lining to said necktie along said line of stitching, said gauge being movable away from said lining and tie after the same are in said relative stitching position.

30. In necktie apparatus, a platform for supporting a necktie lining, a pivoted gauge having a longitudinal surface adapted to hold the lining against the platform, and a longitudinal surface at an angle to and meeting the first surface, adapted to align one edge of a necktie placed on the lining for positioning said necktie with respect to said lining in relative position in which the lining is to be stitched to the necktie, said gauge being movable away from said lining and necktie after the same are in said relative position.

31. In apparatus for stitching a lining to a necktie, a support, means on said support for positioning a necktie lining thereon, a gauge pivotally mounted on said support for the alignment of one edge of the necktie with and along the lateral edge of the gauge and determining the line of stitching, means associated with the gauge and extending substantially from end to end thereof for holding the lining in position for stitching to said necktie along said line of stitching said gauge being movable away from said lining and tie after the same are in said relative stitching position, and prongs on the gauge to penetrate the lining.

32. In necktie making apparatus, a platform having a longitudinal slot and adapted to support a necktie lining overlying said slot, a gauge pivotally mounted on the platform about an axis parallel to said slot and having a portion parallel to said slot for holding the lining down on said platform, said portion having a longitudinal vertical surface serving to align an edge of a necktie placed on the lining in the position in which the same is to be stitched to said lining, said gauge member being movable about its pivot away from said lining and necktie after said lining and necktie have been relatively positioned.

33. In a machine for making neckties, the combination of a platform for receiving a tie lining, means extending along the platform for defining the position which the lining is to have upon the platform, and a holding bar movable toward the platform to a position parallel with the thus extending positioning means and maintained in such position as to engage with the lining lengthwise thereof, the bar having a gauge surface lengthwise which meets the lining when the holding bar is so positioned, and against which gauge surface the meeting side edges of a longitudinally folded tie placed upon the lining may be positioned along a substantially straight line.

34. In a machine for making neckties, the combination of a platform for receiving a tie lining, the platform having an elongated slot, whereover and to each side of which the lining may be positioned on the platform, a holding bar movable toward the platform to a position parallel with the slot and maintained in such position as to engage the lining lengthwise thereof, said bar having a longitudinal straight gauge surface which meets the lining when the holding bar is so positioned and against which the meeting side edges of a longitudinally folded tie placed upon the lining may be positioned.

RUDOLF NAFTALI.
VALENTINE NAFTALI.
HENRY NAFTALI.